Oct. 27, 1959  F. BARFOD  2,910,280
MIXTURE CONTROL DEVICE
Filed April 14, 1954  2 Sheets-Sheet 2
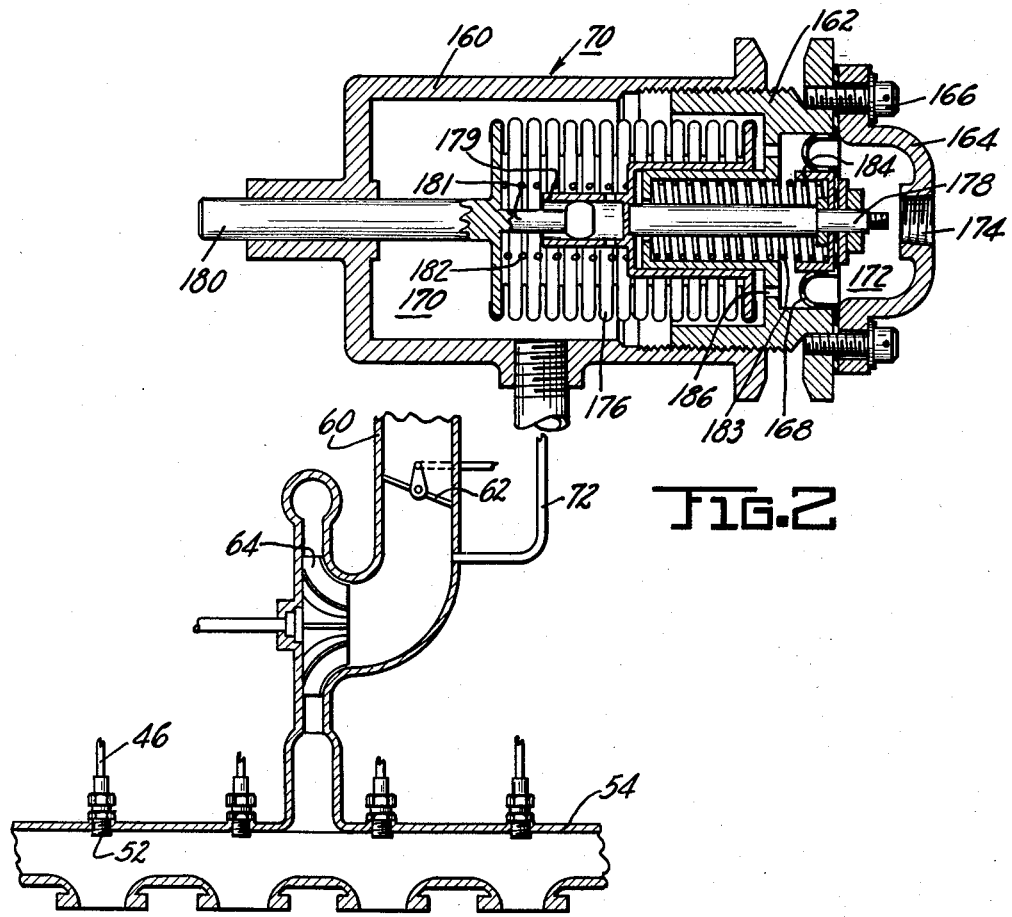
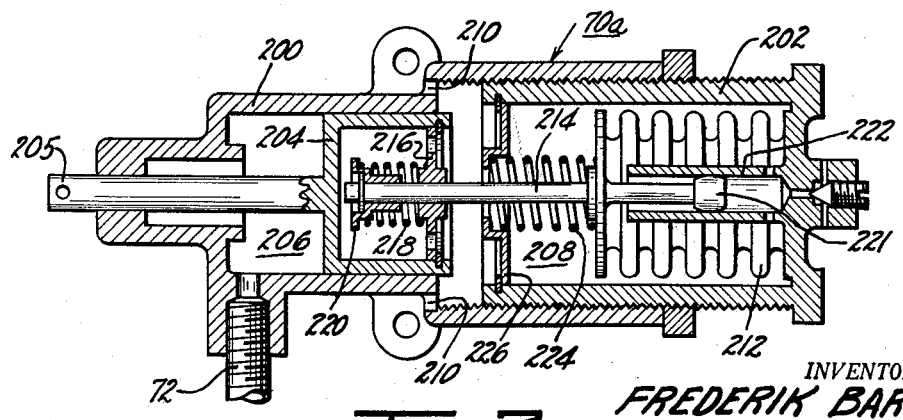
INVENTOR.
FREDERIK BARFOD
BY
James L. O'Brien
ATTORNEY

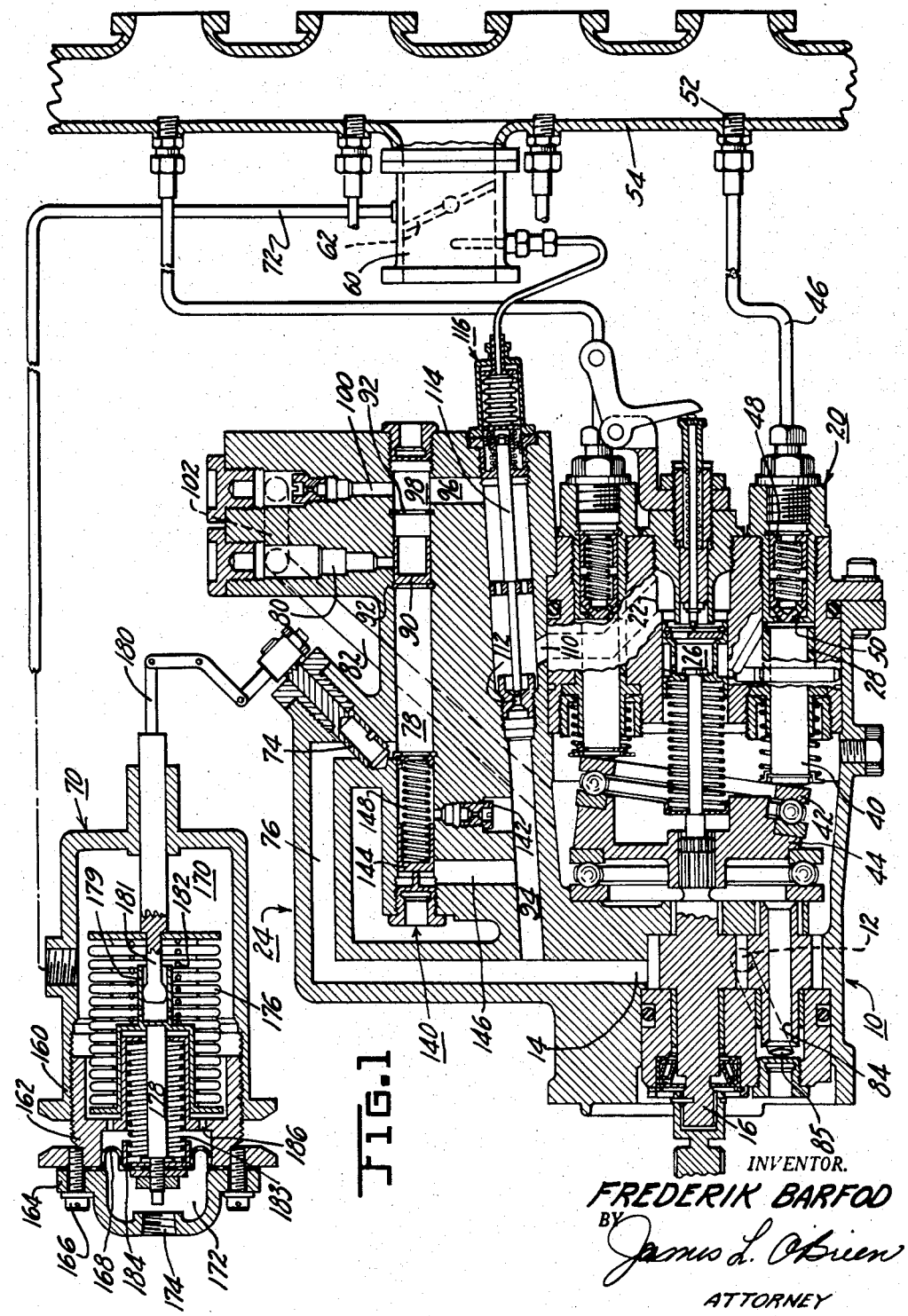

United States Patent Office 2,910,280
Patented Oct. 27, 1959

2,910,280

MIXTURE CONTROL DEVICE

Frederik Barfod, South Bend, Ind., assignor to Bendix Aviation Corporation, South Bend, Ind., a corporation of Delaware Application April 14, 1954, Serial No. 423,183

7 Claims. (Cl. 261—69)

This invention relates to charge forming devices for internal combustion engines and more particularly to mixture controls therefor for regulating or controlling the amount of fuel supplied to an engine as a function of atmospheric pressure, density or manifold pressure. The instant mixture control is particularly adapted for use with a charge forming device of the injection type disclosed in my copending U.S. application Serial No. 377,519, filed August 31, 1953, on which Patent No. 2,786,460 issued on March 26, 1957, and is an improvement over the mixture control disclosed therein.

It is an object of the invention to provide a mixture control device for a fuel injection system which automatically regulates the fuel-air mixture ratio in response to changes in an engine operating condition and atmospheric pressure or density.

Another object of the invention is to provide a mixture control for a fuel injection system which maintains a substantially constant fuel-air mixture ratio as a function of atmospheric air pressure or density and which automatically regulates the fuel-air mixture ratio between predetermined limits as a function of manifold vacuum.

A further object of the invention is to provide a simple compact mixture control for a fuel injector in which the fuel-air mixture ratio is regulated in response to changes in altitude and an engine operating condition, such as, intake manifold pressure.

Other objects and advantages will be readily apparent to one skilled in the art from the following description taken in connection with the accompanying drawings in which:

Figure 1 is a diagrammatic sectional view of a fuel injector embodying the invention;

Figure 2 is a diagrammatic sectional view of the mixture control shown in Figure 1 connected to an induction passage having a suppercharger; and Figure 3 is a partial view in section of a modified form of the invention.

With reference to Figure 1, in which much of the structure is as shown in my copending application Serial No. 377,519, a gear pump 10 having an inlet 12 and an outlet 14 is adapted to be driven by an engine (not shown) through a shaft 16. Fuel under substantially constant pressure is supplied from a source (not shown) to the inlet 12 and is discharged through outlet 14 at a pressure varying as a function of engine speed. A fuel injection pump is shown at 20 having an inlet 22 in communication with the outlet of the gear pump through a fuel metering control generally shown at 24. The fuel discharged by the gear pump is metered by the control unit 24 as a function of manifold pressure and, optionally, ambient air temperature. A portion of this fuel, depending on altitude and engine operating conditions as reflected by manifold pressure and/or ambient air temperature is by-passed to the inlet of the gear pump. A quantity of metered fuel depending on the characteristics of the particular engine being supplied by my fuel feeding system is also by-passed to the inlet of the gear pump. The remainder of the metered fuel flows to the injection pump which delivers the fuel to the manifold of the engine in small individual charges for each cylinder. The size of each charge is regulated by a rotary distributor valve 26 concentrically located with pump cylinders 28.

The number of pumping cylinders provided in the injection pump is correlated with the number of cylinders in the engine with which the fuel feeding system is adapted for use. The pumping cylinders are preferably alike in construction and each contains a plunger 40 urged in a pumping direction by a bearing ring 42 mounted on a wobble plate 44 which is secured to shaft 16. Conduit 46 containing check valve 48, is provided to connect each discharge port 50 with a nozzle 52 located in the manifold 54. Although the nozzles as shown, are discharging into the manifold, it is to be understood that the nozzles could equally well be located in the cylinder wall to discharge directly into each of the cylinders of the engine.

A throttle body 60 with a throttle valve 62 mounted therein is secured to the manifold by suitable bolts (not shown). As shown in Figure 2, a supercharger 64, of conventional design, may also be included in the induction passage.

A mixture control unit 70 forms a part of the fuel metering unit 24 and is connected through a conduit 72 to the induction passage on the engine side of the throttle anterior to the supercharger, if included. The mixture control unit 70 regulates valve 74 in passage 76 controlling the amount of fuel by-passed from the gear pump outlet 14 to the inlet 12 through passages 76, 78, 80, 82, 84 and 85. A pressure equalizing valve 90 located in conduit 78 is freely reciprocable therein between retaining members 92 to control the communication between conduit 78 and passage 80.

A quantity of metered fuel depending on the peculiar characteristics of the engine being supplied by the fuel feeding system, is by-passed through a second by-pass consisting of passages 94, 96, 98, 100, 102, 82, 84 and 85. Pressure equalizing valve 90 separates passage 78 of the first by-pass from passage 98 of the second by-pass and is responsive to any pressure differential that might exist between the two by-passes. Conduit 110 connects passage 94 posterior to the metering restriction 112 with the injection pump inlet 22. A valve 114 controlled by temperature responsive unit 116 may be included in the fuel metering control to regulate the flow through 112 as a function of tempearture or, as explained hereinafter, valve 114 and unit 116 may be omitted from the metering control if desired.

A power enrichment system is provided at numeral 140, consisting of a power enrichment jet 142 connecting conduit 94 with conduit 78. The power enrichment jet is controlled by a valve 144 which on one side is subjected to gear pump outlet pressure through conduits 94 and 146 and on the other side to a force of the spring 148 and the pressure in conduit 78. At low and medium speeds the jet is open thereby by-passing a portion of the fuel from conduit 94 to the conduit 78 and causing the quantity of fuel delivered to the inlet 22 of the injection pump to be decreased. At high speed the gear pump discharge pressure is sufficient to move valve 144 to a position to close the jet, thereby cutting off the by-pass and causing an increase in the quantity of fuel delivered to the injection pump.

The mixture control unit 70, as shown in Figures 1 and 2, includes a housing 160, a partition member 162 threadedly received in said housing and a cover 164 secured to the partition member by suitable bolts 166. Diaphragm 168, marginally clamped between the cover and partition member, divides the interior of the unit into two chambers, 170 and 172, which through conduit 72 and port 174 are subjected to manifold pressure and atmospheric pressure respectively. Located in chamber 170, bellows 176 is connected at one end to diaphragm 168 by a rod 178 and at the other end to valve 74 by a linkage 180. A tubular member 179 secured to an interior end wall of the bellows 176 slidably receives a ball ended rod 181 secured to the opposite interior end wall of the bellows to provide internal support for said bellows.

Bellows 176 may be filled with a pressure and temperature responsive fluid, nitrogen, for example; or it may be evacuated and rendered substantially insensitive to temperature. In the latter instance a spring 182 is located in the interior of the bellows to provide additional internal support therefore. The responsiveness of the bellows to ambient air temperature, in any case, is in part determined by the location of the mixture control unit with respect to the engine being supplied by the fuel feeding system. In some installations temperature control in addition to that provided by the bellows may be desired, in which case the previously described temperature responsive unit 116 is used. Temperature control may be provided by either bellows 176 or unit 116, alone or in combination. It has been discovered that in some installations, such as are used on motor vehicles, that no special correction for ambient air temperature variations is necessary and in such an installation unit 116 is omitted and bellows 176 is evacuated with a calibrated spring 182 inserted in the interior thereof as previously described.

The bellows 176 functions to regulate the quantity of fuel supplied to the manifold to maintain a substantially constant fuel-air mixture ratio supply to the engine. With the bellows evacuated, and the mass of air delivered to the manifold decreasing as a result of a decrease in atmosphere and/or manifold pressures, the pressure in chamber 170 decreases whereupon spring 182 urges linkage 180 in a direction to open valve 74 causing an increase in the amount of fuel by-passed with a consequent reduction in quantity of fuel discharged from the nozzles 52 whereby the fuel-air mixture ratio is maintained substantially constant.

Additional means is included in the mixture control unit 70 to vary the fuel-air mixture ratio between predetermined limits to automatically provide either a rich or power fuel-air ratio or an economy cruising fuel-air ratio in response to changes in engine operating conditions reflected, as for example, in changes in manifold pressure. This means includes a spring 183 reacting between partition member 162 and a retainer 184 centrally clamped to diaphragm 168, said spring urges the diaphragm 168, rod 178, bellows 176 and linkage 180 in a direction to move valve 74 towards closed position to increase the fuel delivered to injection pump 20 and thus enriches the fuel-air ratio to provide a power mixture. The force of spring 183 is opposed by manifold vacuum acting on diaphragm 168 through ports 186, chamber 170 and conduit 72. Whenever the differential between the pressures on opposite sides of the diaphragm, i.e. the difference between atmospheric pressure in chamber 172 and manifold pressure in 170, exceeds a predetermined value the force of spring 183 will be overcome and valve 74 will be moved to or held in a position to obtain an economy or cruising fuel-air mixture ratio. The limits of the fuel-air mixture ratio are established by the length of travel of diaphragm 168 which is limited in one direction by the abutment of spring retainer 184 against partition member 162 and in the other direction by the abutment of bellows 176 against said partition member.

In the embodiment shown in Figure 3, the mixture control unit 70a includes a housing 200 having a cup-shaped end member 202 threadedly received therein. A hollow piston 204 connected to valve 74 through a linkage 205 is slidably disposed in the interior of the housing and forms a movable wall between chambers 206 and 208 which through conduit 72 and ports 210 are subjected to manifold and atmospheric pressures respectively. Bellows 212 is positioned in chamber 208 with one end secured to member 202, as by brazing, and is connected at the other end rod 214 which is supported in a spider 216 mounted in the interior of piston 204. Rod 214 is urged into abutting engagement with said piston by a spring 218 reacting between said spider and a spring retainer 220. Rod 214 projects into the interior of bellows 212 and is provided with a terminal ball 221 which reciprocates in a tubular member 222 to give internal support to said bellows. Spring 224 is positioned between a retainer 226 and the rod end of the bellows to assist in adapting the bellows for use in different installations.

In the operation of the embodiment shown in Figures 1 and 2, fuel under a pressure varying as a function of an engine speed is discharged by gear pump 10 to metering restriction 112 and valve 74 through conduits 94 and 76 respectively. The size of metering restriction 112 may be fixed or may be varied by a valve 114 as a function of manifold air temperature by the temperature unit 116. In either event, a portion of the metered fuel, the amount of which depends on the operating characteristics of the particular engine being supplied by the fuel system, is by-passed through passages 96, 98, 100, 102 and 82, 84 and 85. The remainder of the metered fuel passes through conduit 110 to inlet 22 of the injection pump where rotary valve 26 measures the amount of fuel delivered to each pump cylinder 28.

A portion of the fuel discharged by the gear pump is by-passed through a second by-pass consisting of passages 78, 80, 82, 84 and 85. The amount of fuel thus by-passed is controlled by valves 74, 90 and 144.

Valve 74 is controlled by mixture control unit 70 through linkage 180 connected directly to bellows 176 which is responsive to changes in manifold vacuum and/or ambient air temperature. Movement of valve 74 in response to movement of bellows 176 regulates the amount of fuel by-passed as a function of the mass of air entering the manifold so as to maintain the fuel-air ratio substantially constant. Valve 74 is further regulated by diaphragm 168 which is connected to bellows 176 by rod 178. Spring 183 urges the diaphragm 168 in a direction to close valve 74 to decrease the amount of fuel by-passed through passage 80 and cause an increase in the amount of fuel delivered to the engine and thus produce a power or rich fuel-air mixture ratio. When the absolute manifold pressure drops below atmospheric pressure a predetermined amount, diaphragm 168 will be moved in opposition to spring 183 to move valve 74 toward open position to increase the amount of fuel by-passed through passage 80 and thereby decrease the fuel delivered to the engine to produce an economy or cruising fuel-air mixture ratio. Valve 90 downstream of valve 74 is responsive to the pressure differential between passage 78 and 98 and tends to equalize said pressures.

During low and medium speeds power enrichment jet 142 is open permitting fuel to flow from passage 94 to passage 78 and resulting in a decrease in the amount of fuel delivered to the engine. During high speed operation however, the pressure of fuel in the conduit 46, which varies as a function of engine speed is sufficient to move valve 144 to close jet 142 and thereby effect an increased flow to metering restriction 112.

In the operation of the embodiment shown in Figure 3, the mixture control unit 70a, as in the previous embodiment, regulates the fuel-air mixture ratio in response to changes in atmospheric pressure and engine operating conditions as reflected by manifold pressure. When the absolute manifold pressure in chamber 206 drops below atmospheric pressure a predetermined amount, piston 204 will be moved in opposition to spring 218 in a direction to open valve 74 and thereby decrease the amount of fuel supplied to the engine to produce an economy or cruising fuel-air mixture ratio. When the pressure differential between chamber 206 and 208 no longer exceeds said predetermined amount, spring 218 will move valve toward closed position to increase the fuel supply to the engine and thereby produce a power or rich fuel-air mixture ratio. Bellows 212 is subjected directly to atmospheric pressure and has a lost motion connection with piston 204 through rod 214. Bellows 212 functions, as does bellows 176, to regulate the quantity of fuel supplied to the manifold to maintain a substantially constant fuel-air mixture ratio supply to the engine.

From the above description it will be readily apparent to those skilled in the art that many changes or arrangements of parts may be made without departing from the spirit of my invention.

I claim:

1. In a mixture control device for a fuel feeding system having control means and an induction passage with a throttle therein, a housing, a pressure responsive element dividing the interior of said housing into two separate chambers, means adapted to connect one of said chambers with the atmosphere, means adapted to connect the other of said chambers with the induction passage downstream of said throttle, a pressure responsive element in said last mentioned chamber subjected solely to the pressure therein, means connecting said elements, and means adapted to connect one of said elements to said control means.

2. In a mixture control for a fuel feeding system having a control means and an induction passage with a throttle therein, means responsive to variations in atmospheric pressure for regulating said control means, means operatively connected to said pressure responsive means and responsive to a predetermined induction passage pressure downstream of said throttle for moving said control means in a direction to decrease fuel flow through said system, and resilient means adapted to move said last mentioned pressure responsive means in a direction to increase fuel flow through said system whenever the induction passage pressure is greater than said predetermined pressure.

3. A mixture control device for a fuel feeding system having a fuel valve and an induction passage with a throttle therein comprising a housing, a diaphragm in said housing separating the interior thereof into two chambers, a conduit connecting one of said chambers with said induction passage on the downstream side of the throttle, an atmospheric opening in the wall of the other of said chambers, a bellows in said first mentioned chamber responsive to variations in pressure and temperature therein operatively connected to said valve, a rod connecting said diaphragm with said bellows, and a spring adapted to exert a predetermined force on said diaphragm.

4. In a mixture control for a fuel feeding system having an induction passage with a throttle therein, a housing, a movable wall in said housing dividing the interior thereof into two chambers, a port open to the atmosphere in the wall of one chamber, means connecting the other of said chambers with the induction passage downstream of the throttle, a pressure responsive element in said last mentioned chamber subjected solely to the pressure therein, means operatively connecting said element and movable wall, means limiting the movement of said wall, and means operatively connecting said element and fuel feeding system for regulating the flow of fuel therethrough.

5. A mixture control for a fuel feeding system having an induction passage with a supercharger and a throttle therein comprising a housing, a movable wall in said housing dividing the interior thereof into two chambers, a port in the wall of one of said chambers, a conduit connecting the other of said chambers with said passage between the throttle and supercharger, a pressure responsive element within said last mentioned chamber, means connecting said element and wall, and means adapted to connect said element and wall to said fuel feeding system.

6. In a mixture control device for a fuel feeding system having a fuel control and an induction passage with a throttle therein, means responsive to the pressure differential between the pressure in said induction passage downstream of said throttle and atmospheric pressure, and means operatively connected to said first mentioned means and responsive solely to said first mentioned pressure, said last mentioned means forming a yieldable connection with said fuel control.

7. A mixture control device for a fuel feeding system having a control valve and an induction passage with a throttle therein comprising a housing, a diaphragm in said housnig separating the interior thereof into two chambers, means adapted to connect one of said chambers with said induction passage on the downstream side of the throttle, means adapted to connect the other of said chambers with the atmosphere, a bellows in said first mentioned chamber responsive to variations in pressure therein, means for connecting said bellows with said valve, an operative connection between said diaphragm and said bellows, and resilient means adapted to exert a predetermined force on said diaphragm.

References Cited in the file of this patent
UNITED STATES PATENTS

| | | |
|---|---|---|
| 1,272,204 | Brooks | July 9, 1918 |
| 2,482,401 | Chandler | Sept. 20, 1949 |
| 2,485,430 | Chandler | Oct. 18, 1949 |
| 2,488,250 | Williams | Nov. 15, 1949 |
| 2,580,294 | Griffon | Dec. 25, 1951 |
| 2,611,595 | Streed | Sept. 23, 1952 |